(12) United States Patent
Lee et al.

(10) Patent No.: US 12,695,137 B2
(45) Date of Patent: Jul. 28, 2026

(54) TRACTION BATTERY PACK THERMAL MANAGEMENT SYSTEM AND THERMAL MANAGEMENT METHOD

(71) Applicant: Ford Global Technologies, LLC, Dearborn, MI (US)

(72) Inventors: Nathan Lee, Novi, MI (US); Jie Deng, Novi, MI (US); Liam E. West, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 606 days.

(21) Appl. No.: 18/332,870

(22) Filed: Jun. 12, 2023

(65) Prior Publication Data

US 2024/0413431 A1 Dec. 12, 2024

(51) Int. Cl.
| | |
|---|---|
| *H01M 10/6568* | (2014.01) |
| *H01M 10/625* | (2014.01) |
| *H01M 10/6556* | (2014.01) |
| *H01M 50/224* | (2021.01) |

(52) U.S. Cl.
CPC ..... *H01M 10/6568* (2015.04); *H01M 10/625* (2015.04); *H01M 10/6556* (2015.04); *H01M 50/224* (2021.01); *H01M 2220/20* (2013.01)

(58) Field of Classification Search
CPC .......... H01M 10/6568; H01M 10/625; H01M 10/6556; H01M 50/224; H01M 2220/20
USPC .......................................................... 429/120
See application file for complete search history.

(56) References Cited

U.S. PATENT DOCUMENTS

| | | | |
|---|---|---|---|
| 8,530,069 B2 | 9/2013 | Wood et al. | |
| 11,108,100 B2 | 8/2021 | Harris et al. | |
| 11,626,636 B2 | 4/2023 | Coupar et al. | |
| 11,784,369 B1 * | 10/2023 | Wright ............... | H01M 10/613 |
| | | | 429/50 |
| 2020/0127351 A1 | 4/2020 | Smith et al. | |

FOREIGN PATENT DOCUMENTS

| | | | | |
|---|---|---|---|---|
| CN | 113871747 A | * | 12/2021 | ........ H01M 10/6554 |
| CN | 114006103 A | * | 2/2022 | ......... H01M 10/647 |
| JP | 2022536834 A | | 8/2022 | |
| WO | 2010016771 A1 | | 2/2010 | |
| WO | 2017070785 A1 | | 5/2017 | |

* cited by examiner

*Primary Examiner* — James M Erwin
(74) *Attorney, Agent, or Firm* — David B. Kelley; Carlson, Gaskey & Olds, P.C.

(57) ABSTRACT

A traction battery pack includes a cell stack, an enclosure assembly housing the cell stack, and stand-offs that space-apart the cell stack from a portion of the enclosure assembly to provide a coolant channel configured to communicate a coolant. The stand-offs can be part of the enclosure assembly or part of an insert separate from the enclosure assembly.

19 Claims, 5 Drawing Sheets

TRACTION BATTERY PACK THERMAL MANAGEMENT SYSTEM AND THERMAL MANAGEMENT METHOD

TECHNICAL FIELD

This disclosure relates generally to managing thermal energy within a traction battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. Coolant can be moved through the traction battery pack to help manage thermal energy within the traction battery pack.

SUMMARY

In some aspects, the techniques described herein relate to a traction battery pack, including: a cell stack; an enclosure assembly housing the cell stack; and a plurality of stand-offs that space-apart the cell stack from a portion of the enclosure assembly to provide a coolant channel configured to communicate a coolant.

In some aspects, the techniques described herein relate to a traction battery pack, wherein the coolant is a non-conductive coolant.

In some aspects, the techniques described herein relate to a traction battery pack, wherein the plurality of stand-offs are part of the enclosure assembly.

In some aspects, the techniques described herein relate to a traction battery pack, wherein the enclosure assembly is a metal or metal alloy. In another example, the enclosure assembly is a polymer-based material.

In some aspects, the techniques described herein relate to a traction battery pack, further including an insert providing the plurality of stand-offs, the insert separate from the enclosure assembly.

In some aspects, the techniques described herein relate to a traction battery pack, wherein the coolant channel opens to the cell stack such that coolant communicated through the coolant channel directly contacts the cell stack.

In some aspects, the techniques described herein relate to a traction battery pack, wherein the coolant channel is part of an immersion system for thermal management of the cell stack.

In some aspects, the techniques described herein relate to a traction battery pack, wherein the coolant is a liquid coolant.

In some aspects, the techniques described herein relate to a traction battery pack, wherein the enclosure assembly includes a tray and a cover, the enclosure tray including a bottom wall, wherein at least some of the stand-offs in the plurality of stand-offs extend from the bottom wall to the cell stack.

In some aspects, the techniques described herein relate to a traction battery pack, wherein the enclosure assembly includes a first side wall, a second side wall opposite the first side wall, a first end wall, and a second end wall opposite the first end wall.

In some aspects, the techniques described herein relate to a traction battery pack, wherein the enclosure cover includes a top wall, wherein at least some of the stand-offs in the plurality of stand-offs extend from the top wall to the cell stack, such that the cell stack is spaced from the bottom wall and spaced from the top wall.

In some aspects, the techniques described herein relate to a traction battery pack, wherein the enclosure assembly includes a first side wall, a second side wall opposite the first side wall, a first end wall, and a second end wall opposite the first end wall, wherein the plurality of stand-offs are arranged in rows that are angled relative to the first side wall, the second side wall, the first end wall, and the second end wall.

In some aspects, the techniques described herein relate to a traction battery pack, wherein the rows includes stand-offs having a first length, and stand-offs having a second length that is different than the first length.

In some aspects, the techniques described herein relate to a traction battery pack, wherein the enclosure assembly includes a first side wall, a second side wall opposite the first side wall, a first end wall, and a second end wall opposite the first end wall, wherein the plurality of stand-offs are arranged parallel to the first end wall and parallel to the second end wall.

In some aspects, the techniques described herein relate to a method of managing coolant, including: spacing a cell stack from a portion of an enclosure assembly using a plurality of stand-offs, the spacing providing a coolant channel; and directing a coolant through a coolant channel to manage thermal energy within the cell stack.

In some aspects, the techniques described herein relate to a method, further including immersion cooling the cell stack using the coolant.

In some aspects, the techniques described herein relate to a method, wherein the plurality of stand-offs are part of the enclosure.

In some aspects, the techniques described herein relate to a method, wherein the plurality of stand-offs are stamped within the enclosure.

In some aspects, the techniques described herein relate to a method, wherein the cell stack is sandwiched between stand-offs that extend downward from a top wall of an enclosure cover and stand-offs that extend upward from a bottom wall of an enclosure tray.

In some aspects, the techniques described herein relate to a method, wherein the coolant reservoir is part of an immersion thermal management system.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

An immersion thermal management system can be used to manage thermal energy in a battery pack. When such a system is used, components, such as battery cells, can be at least partially immersed in coolant circulated through the traction battery pack. This disclosure details exemplary systems and methods of managing a flow of coolant within a traction battery pack.

Figure 1:
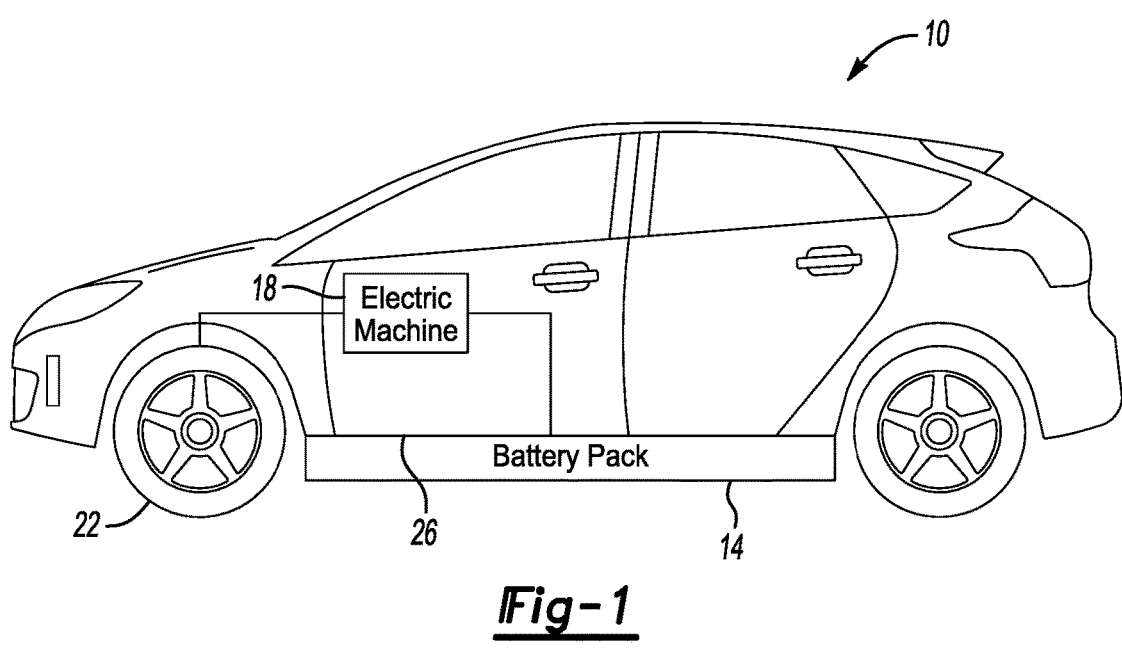
FIG. 1 illustrates a side view of an electrified vehicle having a traction battery pack.

With reference to FIG. 1, an electrified vehicle 10 includes a traction battery pack 14, an electric machine 18, and wheels 22. The traction battery pack 14 powers an electric machine 18, which can convert electrical power to mechanical power to drive the wheels 22. The traction battery pack 14 can be a relatively high-voltage battery.

The traction battery pack 14 is, in the exemplary embodiment, secured to an underbody 26 of the electrified vehicle 10. The traction battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

With reference now to FIGS. 2-5, the traction battery pack 14 includes a cell stacks 30 housed within an enclosure assembly 34. Each of the cell stacks 30 can include a plurality of individual battery cells.

The plurality of battery cells (or simply, "cells") are for supplying electrical power to various components of the electrified vehicle 10. The battery cells are stacked side-by-side relative to one another to provide the cell stacks 30.

In the exemplary embodiment, the enclosure assembly 34 includes an enclosure cover 38 and an enclosure tray 42. The enclosure cover 38 is can be bolted to the enclosure tray 42 in one example of this disclosure. The enclosure cover 38 and the enclosure tray 42 could be connected using other fluid-tight connection techniques, such as adhesive or welds, in other examples. Further, while an exemplary enclosure assembly 34 is shown, the enclosure assembly 34 may vary in size, shape, and configuration within the scope of this disclosure.

The enclosure cover 38 is secured to the enclosure tray 42 to provide an interior arca 46 that houses the cell stacks 30. The traction battery pack 14 includes two cell stacks 30 within the interior area 46 of the enclosure assembly 34. Other components, such as busbars, insulators, control modules, etc. could be additionally housed within the enclosure assembly 34.

Figure 2:
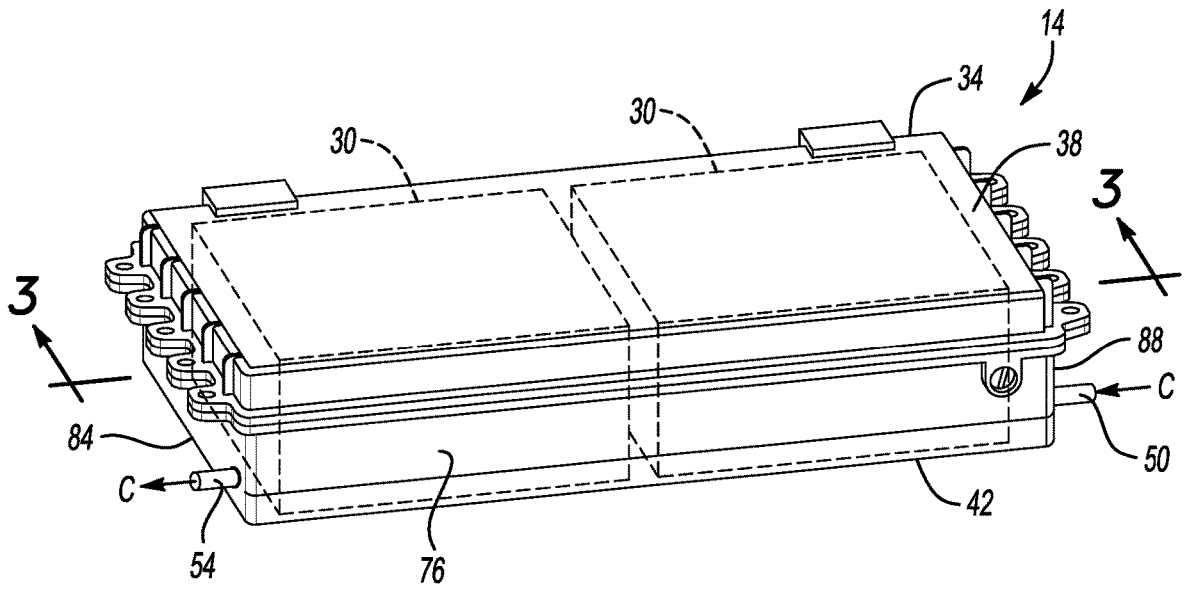
FIG. 2 illustrates a perspective view of the traction battery pack of FIG. 1.
Figures 3, 4:
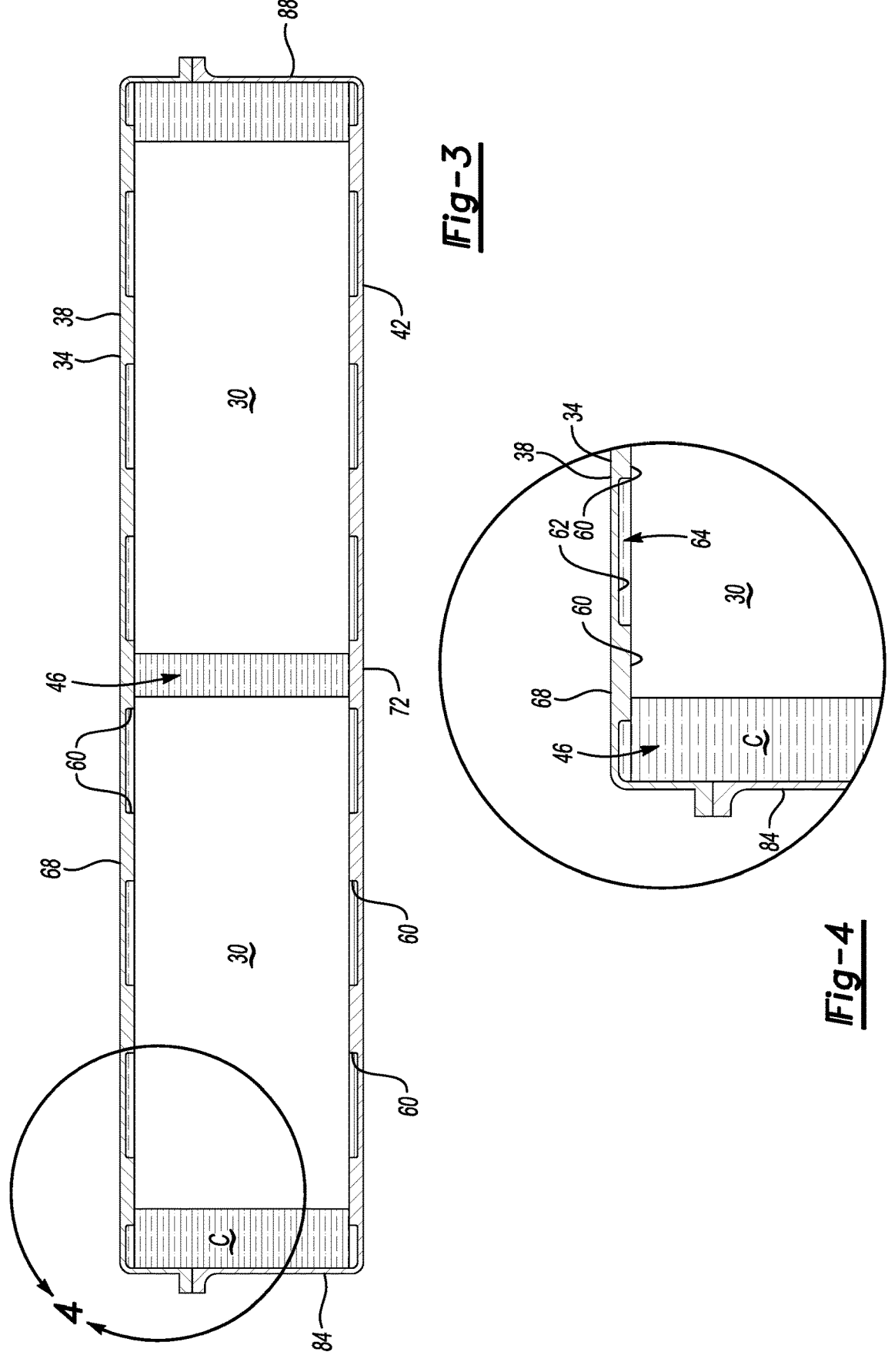
FIG. 3 illustrates a section view at line 3-3 in FIG. 2.
FIG. 4 illustrates a close-up view of an area of FIG. 3.

Although a specific number of cell stacks 30 are illustrated in FIG. 2 of this disclosure, the traction battery pack 14 could include any number of cells and cell stacks 30. In other words, this disclosure is not limited to the specific configuration of cells and cell stacks 30 shown in FIG. 2. Further, the battery pack 14 could be combined with other battery packs 14 to provide a battery pack assembly for the vehicle 10 of FIG. 1.

In this example, the battery cells within the cell stacks 30 are lithium-ion pouch cells. However, battery cells having other geometries (cylindrical, etc.) and/or chemistries (nickel-metal hydride, lead-acid, etc.) could alternatively be utilized within the scope of this disclosure.

Thermal energy levels within the battery cells and the cell stacks 30 can increase as the vehicle 10 is operated. The example vehicle 10 incorporates a thermal management system to manage thermal energy levels of the battery cells, cell stacks 30, and other areas of the traction battery pack 14. The thermal management system can be used to cool the battery cells of the cell stacks 30. In some examples, the thermal management system could be used to heat the battery cells of the cell stacks 30.

The example thermal management system delivers coolant C to the interior arca 46 of the battery pack 14 through an inlet 50. In this example, the coolant C fills all open area within the interior area 46 such that the cell stacks 30 are immersed in, and directly contacted by, the coolant C within the battery pack 14. With the interior area 46, the coolant can take on thermal energy from the cell stacks 30 and other components of the battery pack 14.

Coolant C exits the battery pack 14 through an outlet 54. The coolant C can then move to a thermal energy exchange device, such as a heat exchanger, where thermal energy is transferred from the coolant C. A pump can be operated to circulate the coolant C between the battery pack 14 and the thermal energy exchange device.

The coolant C is a dielectric fluid in this example. The coolant can be an oil. The non-conductive coolant C may be a liquid designed for immersion cooling the cell stacks 30. The chemical make-up and design characteristics (e.g., dielectric constant, maximum breakdown strength, boiling point, etc.) of the coolant C may vary depending on the environment the battery pack 14 is to be employed within.

Unlike the conductive glycol often utilized within known cold plate systems, the coolant C received inside the immersion cooled cell stacks 30 of this disclosure allows for direct contact with the battery cells and other electrified components without causing electrical shorts, thereby improving cooling and performance. The exemplary immersion cooling strategies further enable high rate charging and discharging and allow for high load demands without increasing the hardware size of the battery arrays.

The battery pack 14 includes a flow management system incorporating features that facilitate thermal energy transfer between the coolant C and components of the battery pack 14. As an example, the battery pack includes a plurality of stand-offs 60 that are used to space-apart the cell stacks 30 from a portion 62 of the enclosure assembly 34 to provide a coolant channel 64 between the cell stacks 30 and the portion of the enclosure assembly 34. The coolant C can communicate through the coolant channel 64 to cool the cell stacks 30 as the coolant C moves from the inlet 50 to the outlet 54.

In the exemplary embodiment, the stand-offs 60 are part of the enclosure assembly 34. The enclosure cover 38 and the enclosure tray 42 can be metal or metal alloy that is nominally three millimeters thick. The stand-offs 60 can be considered dimples within the enclosure assembly 34 in some examples. The shape, orientation, size, height, of the stand-offs 60 can be varied to provide design spacing for the coolant C.

The enclosure cover 38 and the enclosure tray 42 can be cast to include the stand-offs 60. In another example, the stand-offs 30 could be stamped. In yet another example, the stand-offs 60 could be provided on an insert that is separate from the enclosure assembly 34 and that fits within the interior area 46 between the enclosure assembly 34 and the cell stacks 30.

The enclosure cover 38 includes a top wall 68. Some of the stand-offs 60 extend from the top wall 68 vertically downward to the cell stacks 30. The enclosure tray 42 includes a bottom wall 72. Some of the stand-offs 60 extend from the bottom wall 72 vertically upward to the cell stacks 30. The cell stacks 30 are thus sandwiched vertically between stand-offs 60 above and below the cell stacks 30 and spaced vertically from the top wall 68 and the bottom wall 72 to establish coolant channels above and below the cell stacks 30.

The enclosure assembly includes a first side wall 76, a second side wall 80 opposite the first side wall 76, a first end wall 84, and a second end wall 88 opposite the first end wall 84. The enclosure cover 38 and the enclosure tray 42 each provide part of the first side wall 76, the second side wall 80, the first end wall 84 and the second end wall 88. In another example, the enclosure cover 38 or the enclosure tray 42 provides the first side wall 76, the second side wall 80, the first end wall 84, and the second end wall 88.

Figure 5:
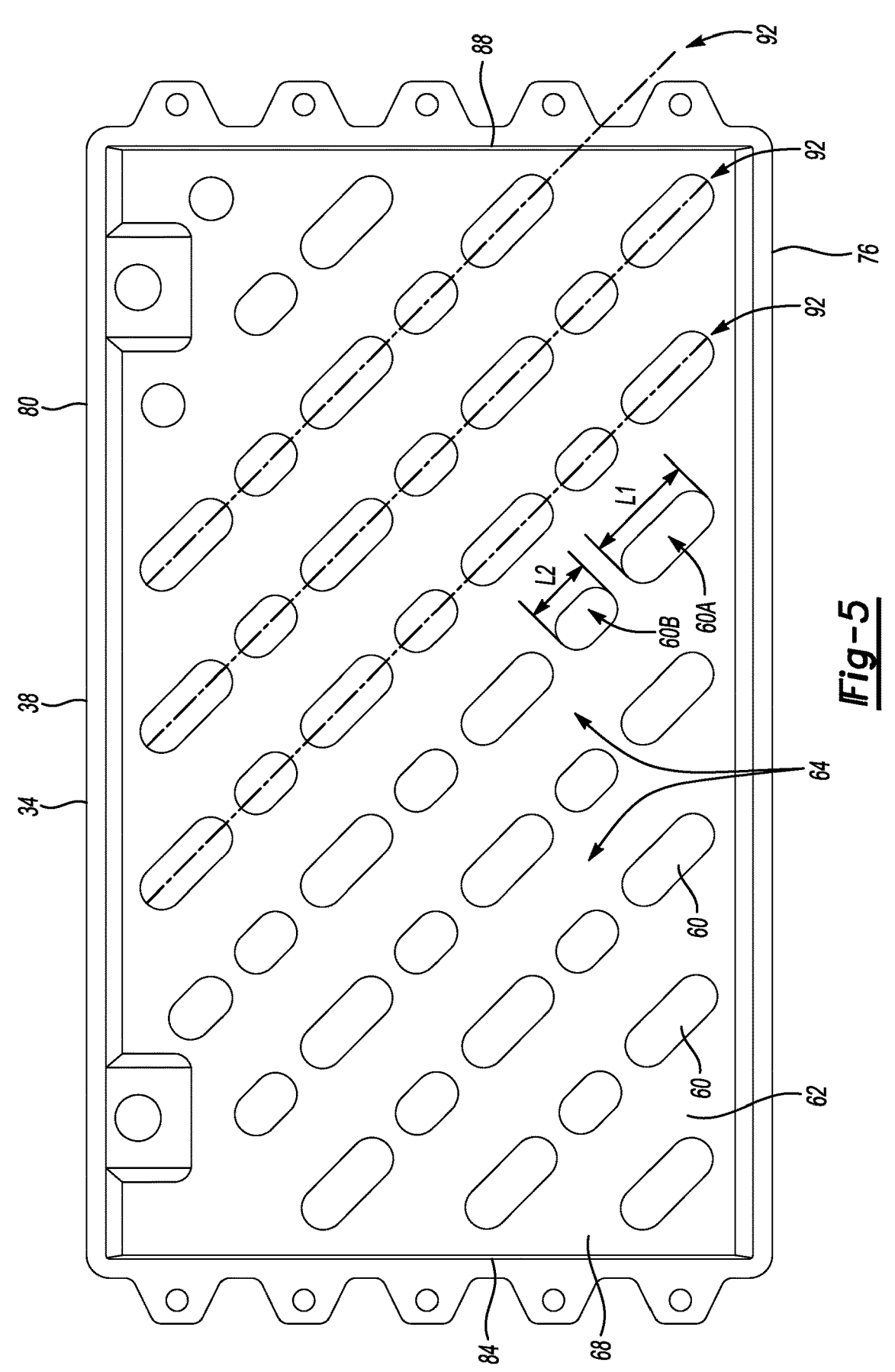
FIG. 5 illustrates a view of an underside of an enclosure cover of the traction battery pack of FIGS. 2-4.

As shown in connection with the enclosure cover 38 of FIG. 5, the plurality of stand-offs 60 are arranged in rows 92 that are angled relative to the first side wall 76, the second side wall 80, the first end wall 84, and the second end wall 88. In this example, the rows 92 are forty-five degrees offset from the first side wall 76, the second side wall 80, the first end wall 84, and the second end wall 88.

The stand-offs 60, in this example, include stand-offs 60A having a first length L1, and stand-offs 60B having a second length L2 that is different than the first length. In other examples, stand-offs having other lengths could be used.

The angling of the rows 92, the varied lengths of the stand-offs 60, or both, can help to direct the coolant C along a circuitous path, which can facilitate effective thermal transfer between the coolant C and the different areas of the cell stacks 30.

The stand-offs 60 shown in FIG. 5 extend from the enclosure cover 38. The stand-offs 60 extending from the bottom wall 72 of the enclosure tray 42 could be similarly arranged to have angled rows and varied lengths.

Figures 6, 7:
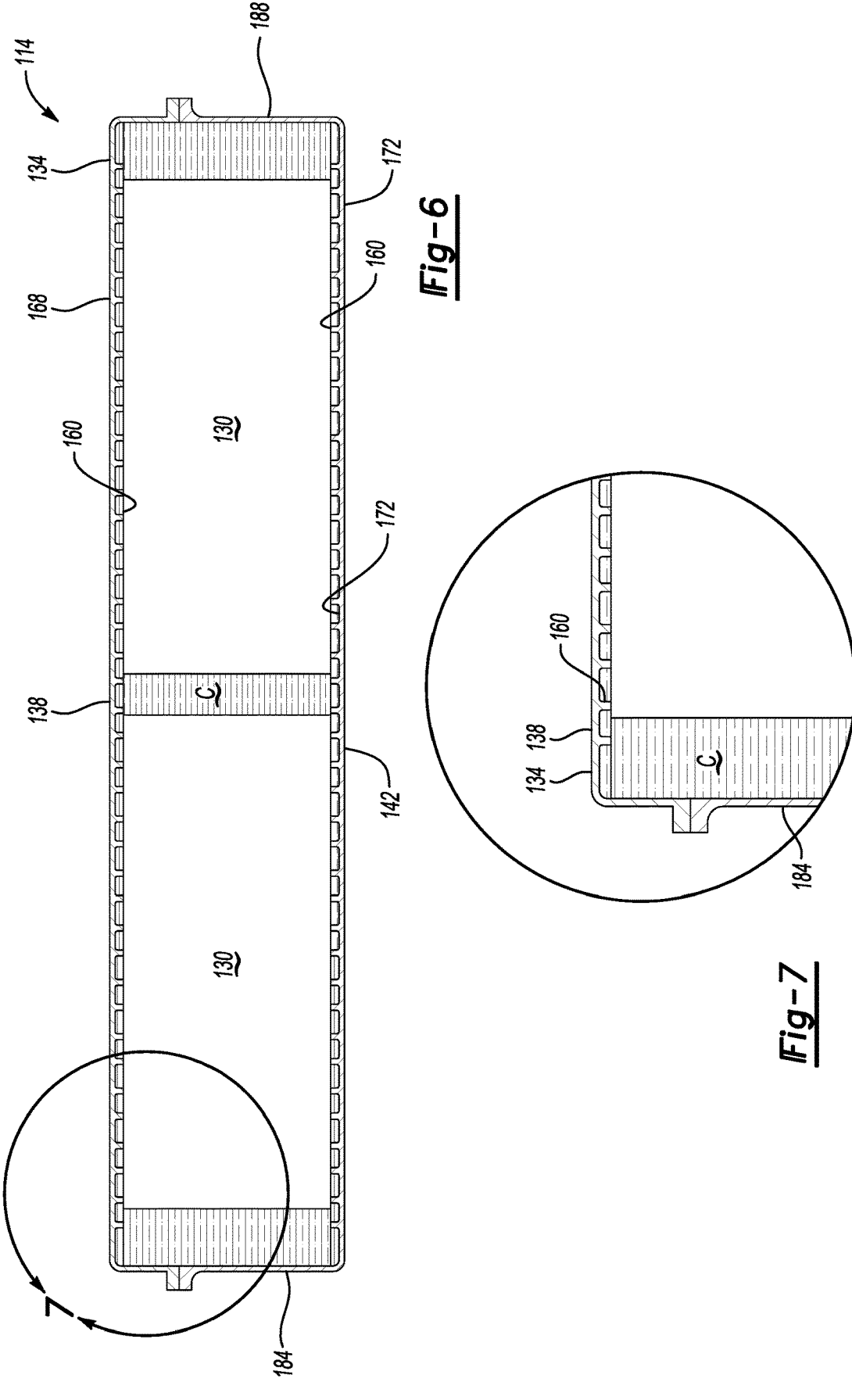
FIG. 6 illustrates a section view of a traction battery pack according to another exemplary aspect of the present disclosure.
FIG. 7 illustrates a close-up view of an area of FIG. 6.
Figure 8:
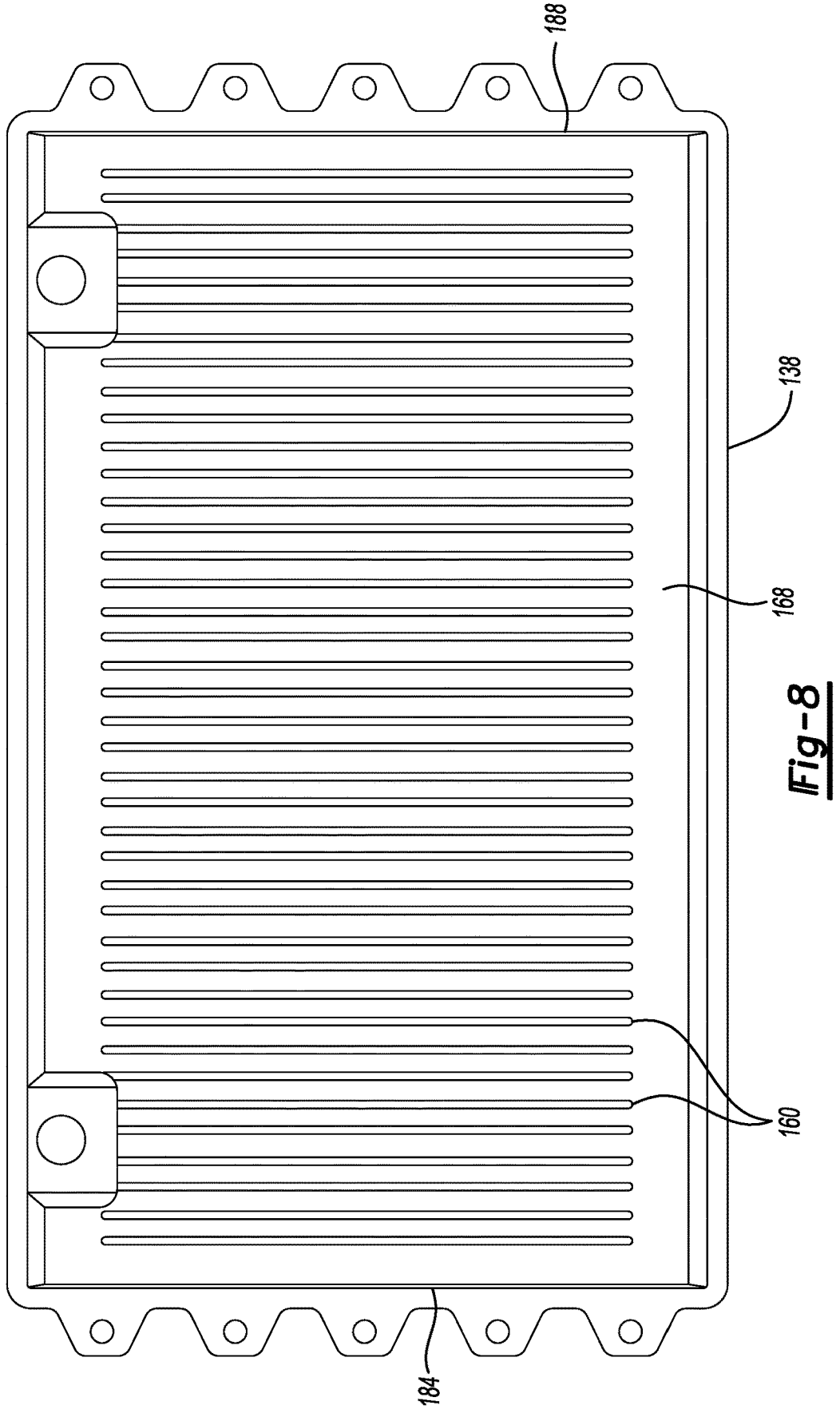
FIG. 8 illustrates a view of an underside of an enclosure cover of the traction battery pack of FIGS. 6 and 7.

With reference now to FIGS. 6-8, another example battery pack 114 includes an enclosure assembly 134 having an enclosure cover 138 and an enclosure tray 142. A plurality of stand-offs 160 extend from a top wall 168 of an enclosure cover 138 or from a bottom wall 172 of an enclosure tray 142. The plurality of stand-offs 160 are arranged parallel to a first end wall 184 and parallel to a second end wall 188. Coolant C can move over a top of the cell stacks 30 and beneath the cell stacks 30 within the spaces provided by the stand-offs 160.

It should be understood that terms such as "about," "substantially," and "generally" are not intended to be boundaryless terms, and should be interpreted consistent with the way one skilled in the art would interpret those terms. It should also be understood that directional terms such as "upper," "top," "vertical," "forward," "rear," "side," "above," "below," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery pack, comprising:
a cell stack;
an enclosure assembly housing the cell stack, the enclosure assembly including an enclosure tray and an enclosure cover, the enclosure tray including a bottom wall, the enclosure cover including a top wall; and
a plurality of stand-offs that space-apart the cell stack from a portion of the enclosure assembly to provide a coolant channel configured to communicate a coolant, wherein at least some of the stand-offs in the plurality of stand-offs extend from the bottom wall to the cell stack and at least some of the stand-offs in the plurality of stand-offs extend from the top wall to the cell stack such that the cell stack is spaced from the bottom wall and spaced from the top wall.

2. The traction battery pack of claim 1, wherein the coolant is a non-conductive coolant.

3. The traction battery pack of claim 1, wherein the plurality of stand-offs are part of the enclosure assembly.

4. The traction battery pack of claim 3, wherein the enclosure assembly is a metal or metal alloy.

5. The traction battery pack of claim 1, further comprising an insert providing the plurality of stand-offs, the insert separate from the enclosure assembly.

6. The traction battery pack of claim 1, wherein the coolant channel opens to the cell stack such that coolant communicated through the coolant channel directly contacts the cell stack.

7. The traction battery pack of claim 1, wherein the coolant channel is part of an immersion system for thermal management of the cell stack.

8. The traction battery pack of claim 1, wherein the coolant is a liquid coolant.

9. The traction battery pack of claim 1, wherein the enclosure assembly includes a first side wall, a second side wall opposite the first side wall, a first end wall, and a second end wall opposite the first end wall.

10. The traction battery pack of claim 1, wherein the enclosure assembly includes a first side wall, a second side wall opposite the first side wall, a first end wall, and a second end wall opposite the first end wall, wherein the plurality of stand-offs are arranged in rows that are angled relative to the first side wall, the second side wall, the first end wall, and the second end wall.

11. The traction battery pack of claim 10, wherein the rows include stand-offs having a first length, and stand-offs having a second length that is different than the first length.

12. The traction battery pack of claim 1, wherein the enclosure assembly includes a first side wall, a second side wall opposite the first side wall, a first end wall, and a second end wall opposite the first end wall, wherein the plurality of stand-offs are arranged parallel to the first end wall and parallel to the second end wall.

13. A method of managing coolant, comprising:

spacing a cell stack from a portion of an enclosure assembly using a plurality of stand-offs, the spacing providing a coolant channel; and directing a coolant through the coolant channel to manage thermal energy within the cell stack, wherein the cell stack is sandwiched between stand-offs that extend downward from a top wall of an enclosure cover and stand-offs that extend upward from a bottom wall of an enclosure tray.

14. The method of claim 13, further comprising immersion cooling the cell stack using the coolant.

15. The method of claim 13, wherein the plurality of stand-offs are part of the enclosure.

16. The method of claim 13, wherein the plurality of stand-offs are stamped within the enclosure.

17. A battery pack, comprising:

a cell stack;

an enclosure assembly housing the cell stack; and a plurality of stand-offs that space-apart the cell stack from a portion of the enclosure assembly to provide a coolant channel configured to communicate a coolant, wherein the plurality of stand-offs includes stand-offs having a first length, and stand-offs having a second length that is different from the first length.

18. The battery pack of claim 17, wherein the enclosure assembly includes a first side wall, a second side wall opposite the first side wall, a first end wall, and a second end wall opposite the first end wall, wherein the plurality of stand-offs are arranged in rows that are angled relative to the first side wall, the second side wall, the first end wall, and the second end wall.

19. The battery pack of claim 18, wherein the rows include stand-offs having the first length, and stand-offs having the second length that is different than the first length.

* * * * *